No. 619,138.                                 Patented Feb. 7, 1899.
A. S. CHASE.
TRAP NET.
(Application filed Aug. 16, 1898.)
(No Model.)
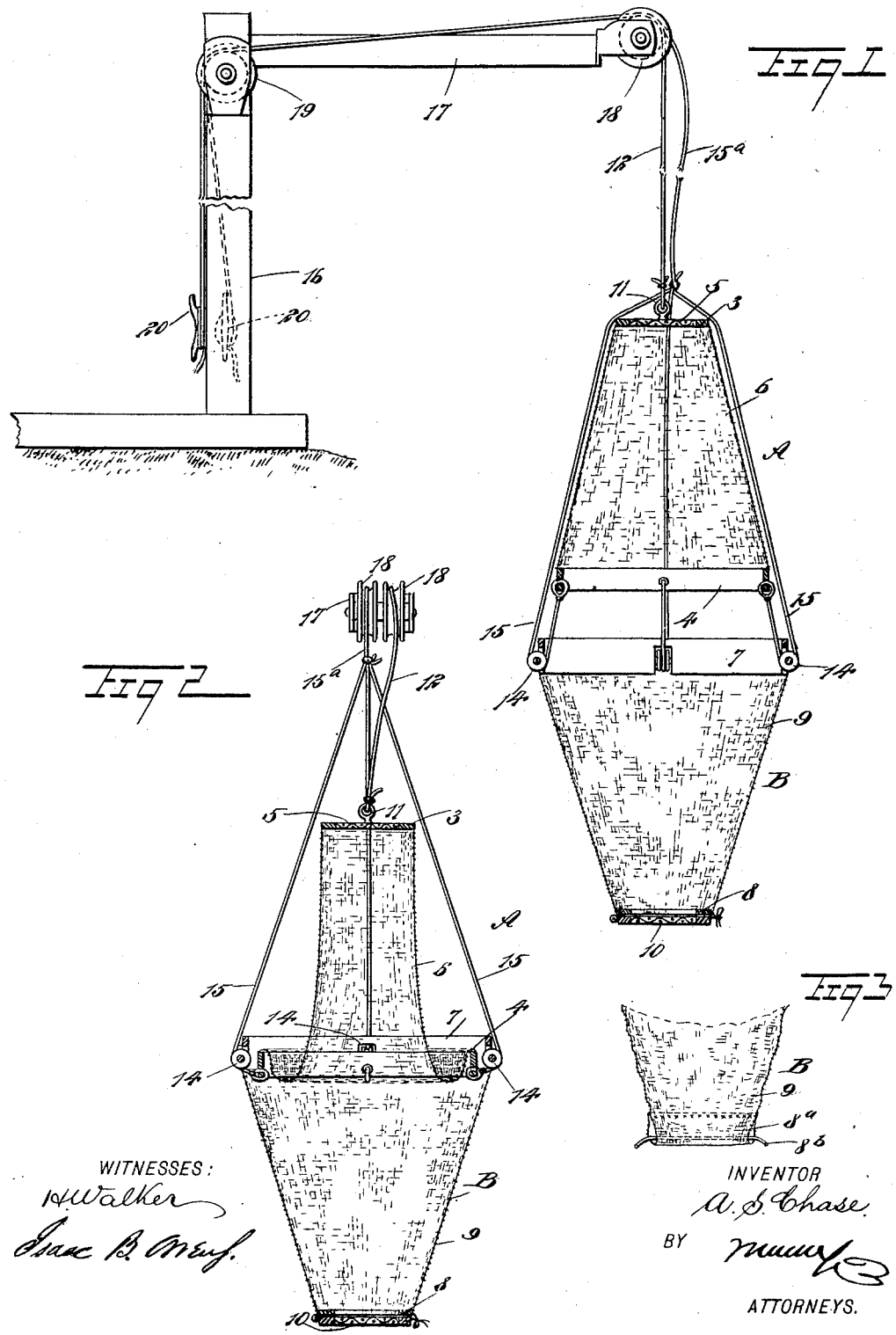
WITNESSES:                                    INVENTOR
H. Walker                                     A. S. Chase
Isaac B. Owen                            BY   Munn
                                              ATTORNEYS.

UNITED STATES PATENT OFFICE.

ABNER S. CHASE, OF MARSHALLTOWN, IOWA.

TRAP-NET.

SPECIFICATION forming part of Letters Patent No. 619,138, dated February 7, 1899.

Application filed August 16, 1898. Serial No. 688,687. (No model.)

*To all whom it may concern:*

Be it known that I, ABNER SILSBY CHASE, of Marshalltown, in the county of Marshall and State of Iowa, have invented a new and Improved Trap-Net, of which the following is a full, clear, and exact description.

This invention is a trap-net provided with two sections, the upper of which has a line connected with its upper portion, and said section having additional lines connected with its lower portion and rove through the lower section, so that by drawing on the first-named line the upper section may be lifted from the lower section, and so that by drawing on the second-named lines the two sections will be drawn together.

This specification is the disclosure of one form of my invention, while the claims define the actual scope of the invention.

Reference is to be had to the accompanying drawings, forming a part of this specification, in which similar characters of reference indicate corresponding parts in all the figures.

Figure 1 is a sectional elevation of my invention, showing the net open. Fig. 2 is a similar view thereof, showing the net closed; and Fig. 3 is a detail section of a modification.

The upper section A of the net is in shape approximately the frustum of a cone and is constructed of a top hoop 3 and a bottom hoop 4, the top hoop 3 having a web of netting 5 and the two hoops being connected by a tapering net 6 of tubular form. The web 5 of the hoop 3 is preferably of metallic sieving, while the net 6 is preferably of cotton or linen thread, netting-twine, or any other suitable material.

The bottom section B of the net is of the same form as the section A and has a top hoop 7 and a bottom hoop 8, the two being joined by a tapering net 9 of tubular form, similar to the net 6 and preferably constructed of like material. The hoop 8 has a hinged circular closure 10, with a web similar to the web 5, and said closure may be closed by means of fastening-cords, such as are shown in Figs. 1 and 2. By opening the closure 10 the net may be discharged of its contents.

The hoop 4 is of less size than the hoop 7, so that the hoop 4 may be encircled by the hoop 7 when the net is closed, as shown in Fig. 2.

The web 5 of the hoop 3 is provided with a rigid eye 11, to which a cord or line 12 is connected. The hoop 7 is provided with four sheaves 14, located at equidistant points on its circumference and having the cords or lines 15, respectively, rove thereover. The cords or lines 15 are connected with the hoop 4 and passed from the sheaves 14 upward to a point above the section A, where they are preferably joined to a single cord or line 15$^a$. By these two lines 12 and 15$^a$ the net is manipulated. By drawing up on the line 12 and slacking off the line 15$^a$ the section A is lifted from the section B, as shown in Fig. 1, and by drawing up on the line 15$^a$ and slacking off the line 12 the section A is pulled down into the position shown in Fig. 2.

The net may be suspended by attaching the lines 12 and 15$^a$ to any suitable support or by holding them manually. Should a support be desired, that shown in the drawings is considered preferable. This support consists in a standard 16, having an outrunning arm 17, the arm carrying two sheaves 18, over which the lines 15$^a$ and 12 are respectively passed, and the standard having two sheaves 19, (only one of which is shown in the drawings,) over which said lines are also passed, thus leading the lines inwardly along the arm 17 and permitting them to be led downward and fastened to cleats 20 on the standard 16.

In the modification shown in Fig. 3 the hoop 8 is dispensed with and the lower end of the netting 9 of the section B of the net is formed with a casing 8$^a$, containing a cord, drawstring, or puckering-string 8$^b$. By these means the lower end of the section B may be closed and opened with great ease.

This invention is useful for trapping all kinds of animals and fishes. The net may be placed in any position or locality, and by baiting the bottom of the section B and suspending the net by the line 12 animals or fishes attracted by the bait will enter the lower section, and then by slacking off the line 12 and pulling on the line 15$^a$ the sections will be closed and the capture of the animal or fish will be accomplished. When the trap is suspended by the line 12, the hoop 3 engages with the lines 15 at the point adjacent to that of their connection with the line 15ª, thus preventing the section A from moving up farther than the position shown in Fig. 1 and holding the two sections in proper relative position, so that they may be readily closed when necessary.

Having thus described my invention, I claim as new and desire to secure by Letters Patent—

1. A trap-net having two sections adapted for movement toward and from each other to open and close the net, a line attached to the upper section by which to support the net when open, and a second line attached to the upper section and rove through the lower section, by which to support the net when closed.

2. A trap-net having two sections, each shaped approximately as the frustum of a cone, a line attached to the upper portion of the upper section to support the net when in open position, and a second line attached to the lower portion of the upper section and rove through the lower section, to support the net when in closed position.

3. A trap-net having two sections, each of which has a hoop at its upper and lower ends, netting extending between the hoops, the immediately-adjacent hoops of the two sections being of different diameters, so that one may be encircled by the other, netting forming the webs of one of the two outermost hoops of the two sections, a closure for the other of the two outermost hoops, a line attached to the upper portion of the upper section, and a second line attached to the lower portion of the upper section and rove through the lower section, by which lines respectively the net is supported in open and closed positions.

ABNER S. CHASE.

Witnesses:
OTIS H. SHURTLIFF,
ISRAEL GREGG.